(12) United States Patent
Kang

(10) Patent No.: US 6,324,902 B1
(45) Date of Patent: *Dec. 4, 2001

(54) APPARATUS AND METHOD FOR INSPECTING PHASE ANGLE ERROR OF CAMSHAFT FOR AN INTERNAL COMBUSTION ENGINE

(75) Inventor: Hyun-Chul Kang, Ulsan-si (KR)

(73) Assignee: Hyundai Motor Company, Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,401

(22) Filed: Dec. 7, 1998

(30) Foreign Application Priority Data

Jun. 16, 1998 (KR) .................................................. 98-22504

(51) Int. Cl.[7] .............................. G01L 3/26; G01M 15/00
(52) U.S. Cl. .......................... 73/116; 73/117.2; 73/117.3; 73/119 R
(58) Field of Search ................................. 73/116, 117.2, 73/117.3, 119 R; 123/193 M, 90.17, 90.16; 33/519; 269/34, 232–236, 229, 199; 248/674, 676, 304, 305

(56) References Cited

U.S. PATENT DOCUMENTS

| | | | | |
|---|---|---|---|---|
| 5,024,187 | * | 6/1991 | Bakker | 123/193 M |
| 5,508,944 | * | 4/1996 | Danielli | 33/519 |
| 5,529,034 | * | 6/1996 | Sone et al. | 123/90.17 |

* cited by examiner

Primary Examiner—Benjamin R. Fuller
Assistant Examiner—Maurice Stevens

(57) ABSTRACT

An apparatus for inspecting a phase angle error of a camshaft having a plurality of cams and a first location hole with a predetermined design phase angle with respect to the cams. The apparatus includes a supporter for horizontally supporting the camshaft, a clamping member for fixing at least one reference cam of the camshaft at a predetermined angle, and a first inspecting member for inspecting an actual location of the first location hole of the camshaft, thereby inspecting a phase angle error of the camshaft.

14 Claims, 5 Drawing Sheets

| Insertion Depth | Phase Angle Error |
|---|---|
| D6 | 1.50° |
| D5 | 1.25° |
| D4 | 1.00° |
| D3 | 0.75° |
| D2 | 0.50° |
| D1 | 0.25° |

| Insertion Depth | Phase Angle Error |
|---|---|
| D6' | 2.51° |
| D5' | 2.09° |
| D4' | 1.65° |
| D3' | 1.25° |
| D2' | 0.84° |
| D1' | 0.42° |

APPARATUS AND METHOD FOR INSPECTING PHASE ANGLE ERROR OF CAMSHAFT FOR AN INTERNAL COMBUSTION ENGINE

BACKGROUND OF THE INVENTION (a) Field of the Invention

The present invention relates to an apparatus and method for inspecting a phase angle error of a camshaft for an internal combustion engine.

(b) Description of the Related Art

Generally, a camshaft is driven at one-half crankshaft speed in a four-stroke-cycle engine by either a gear, a chain and sprocket, or a cog belt and sprocket. The camshaft has as many cams as the number of intake and exhaust valves. The cams are formed at a predetermined phase angle to open and close the valves at a controlled rate of speed, as well as at precise times in relation to piston position.

Therefore, if the phase angle becomes mis-aligned when manufacturing the camshaft, precise valve timing cannot be attained, lowering the performance of the engine. It is therefore necessary to check the phase angle error of each camshaft. The following method is typically used to inspect the phase angle error.

The phase angle of a camshaft is measured by an apparatus and then compared with a design phase angle to determine if the camshaft is fit for use in an actual engine. A well known apparatus for measuring the phase angle is the three-dimensional measuring apparatus.

The three-dimensional measuring apparatus comprises a detector moving along X, Y and Z axes perpendicular to each other, and a measuring device that reads the amount of movement of the detector along the axes and measures a position and outer shape of an object. The phase angle of a camshaft can be measured using such a three-dimensional measuring apparatus.

However, the three-dimensional measuring apparatus is expensive. One reason for the high cost is that the three-dimensional measuring apparatus is designed to make various measurements (i.e., location, distance, outline, and shape) of numerous different objects in addition to the phase angle of camshafts. Also, the measuring process is complicated, increasing the amount of time needed to measure the camshaft phase angle, as well as requiring a skilled operator to perform the measurements.

SUMMARY OF THE INVENTION

Therefore, the present invention has been made in an effort to solve the above-described drawbacks.

It is an object of the present invention to provide an apparatus for inspecting a phase angle error of a camshaft, which is inexpensive and simple in structure.

It is another object of the present invention to provide a method for inspecting a phase angle of a camshaft, which can reduce the amount of time needed to take measurements.

It is still another object of the present invention to provide an apparatus for inspecting a phase angle of a camshaft, which is easy to operate.

To achieve the above objects, the present invention provides an apparatus for inspecting a phase angle error of a camshaft having a plurality of cams and a first location hole with a predetermined design phase angle with respect to the cams, the apparatus comprising a supporter for horizontally supporting the camshaft; a clamping member for fixing at least one reference cam of the camshaft at a predetermined angle; and a first inspecting member for inspecting an actual location of the first location hole of the camshaft, thereby inspecting a phase angle error of the camshaft.

If the camshaft has a second location hole having a predetermined design phase angle with respect to the cams, the apparatus may further comprise a second inspecting member for inspecting an actual location of the second location hole of the camshaft, thereby inspecting a phase angle error of the camshaft.

The apparatus may further comprise a horizontal base plate on which the supporter and the clamping member are fixed.

The supporter comprises a first block having a groove on which a first end of the camshaft is stably disposed, and a second block having a groove on which a second end of the camshaft is stably disposed.

The clamping member comprises a cam master having a recess complemental to a lobe of the reference cam, and a hydraulic pressure assembly for securely fixing the reference cam on the cam master by pressing a base circular portion of the reference cam.

The hydraulic pressure assembly comprises a hydraulic cylinder for generating pressing force, a press rod for transmitting the pressing force to the reference cam, and a press pad connected to the press rod to press the reference cam against the cam master.

Each of the measuring member comprises a check pin for checking the actual location of the location hole and a supporting plate for movably supporting the check pin such that the check pin moves toward a design location of the location hole, the design location of the location hole having the predetermined design phase angle with respect to the reference cam.

Each of the check pins comprises a first rod movably supported by the supporting plate, a second rod extending from the first rod and having a diameter equal to that of the location hole, and a taper rod extending from the second rod and tapered at a predetermined angle such that according to an amount of an insertion depth of the taper rod into the location hole, a deviation of the actual location of the location hole from the design location can be checked, thereby determining the phase angle error of the camshaft.

According to another aspect, the present invention provides a method for inspecting a phase angle error of a camshaft having first and second location holes each having a predetermined design phase angle with respect to a reference cam of the camshaft, comprising the steps of fixing the camshaft such that the reference cam cannot be moved; inserting a first checking member into the first location hole, the first checking member moving toward a design location of the first location hole; checking a deviation of an actual location of the first location hole from the design location in accordance with an amount of inserting depth of the first checking member into the first location hole; and determining if the camshaft passes or fails in accordance with an amount of the deviation of the actual location first location hole.

The method may further comprise the steps of inserting a second checking member into a second location hole, the second checking member moving toward a design location of the second location hole; checking a deviation of an actual location of the second location hole from the design location in accordance with an amount of inserting depth of the second checking member into the second location hole; and determining if the camshaft passes or fails in accordance with an amount of the deviation of the actual locations of the first and second location holes.

BRIEF DESCRIPTION OF THE DRAWINGS

These and other features, aspects, and advantages of the present invention will become better understood with regard to the followings description, appended claims, and accompanying drawings where:

DETAILED DESCRIPTION OF THE PREFERRED EMBODIMENTS

Reference will now be made in detail to the present preferred embodiments of the invention, an example of which is illustrated in the accompanying drawings. Wherever possible, the same reference numbers will be used throughout the drawings to refer to the same or like parts.

Figure 1:
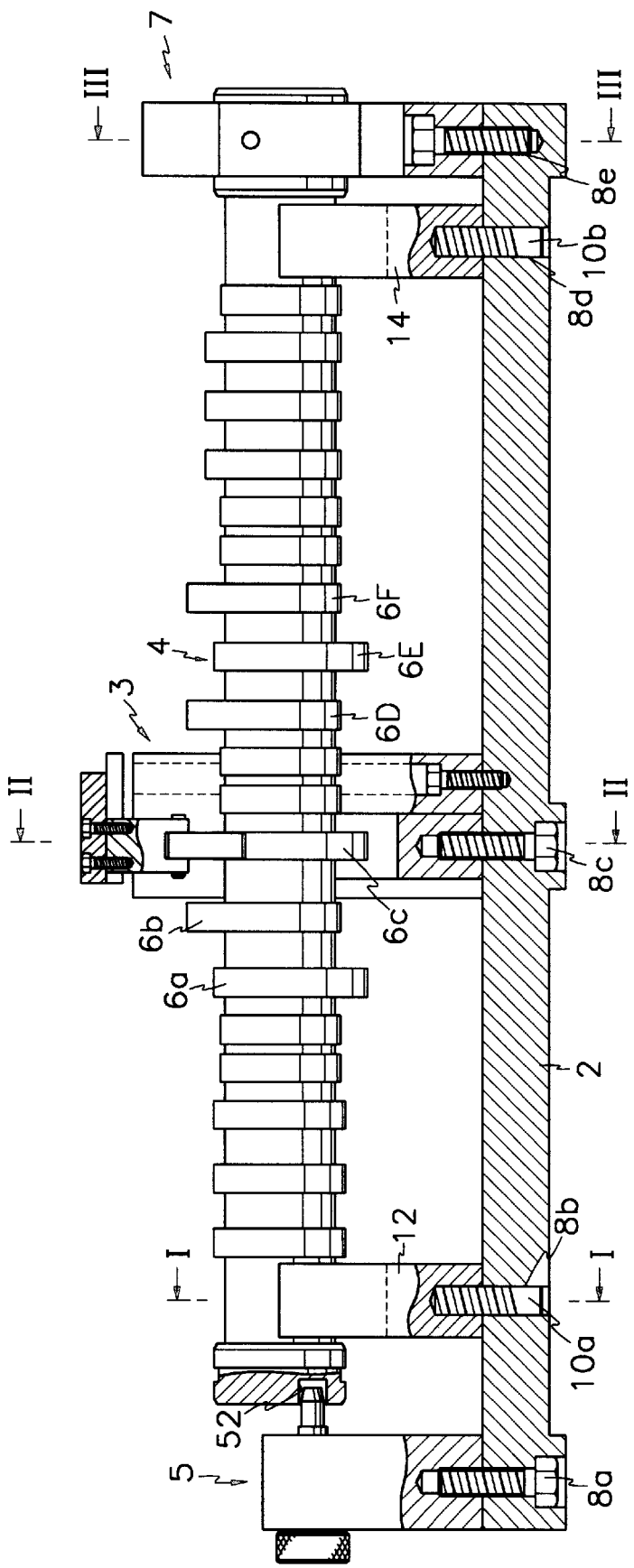
FIG. 1 is a side view partly in section illustrating an apparatus for inspecting a phase angle of a camshaft according to a preferred embodiment of the present invention.

Referring first to FIG. 1, there is shown a side view illustrating an apparatus for inspecting a phase angle of a camshaft according to a preferred embodiment of the present invention.

The apparatus comprises a horizontal base plate 2, and first and second supporters 12 and 14 mounted on opposite sides of the horizontal base plate 2 to horizontally support a camshaft 4. A clamping member 3 is mounted on the horizontal base plate 2 to fix a reference cam 6c at a predetermined angle, among a plurality of cams 6a, 6b, 6c, 6d, 6e and 6f. First and second inspecting members 5 and 7 are also mounted on the horizontal base plate 2 to determine if a phase angle of the camshaft 4 is in an exact phase angle position.

Figure 2:
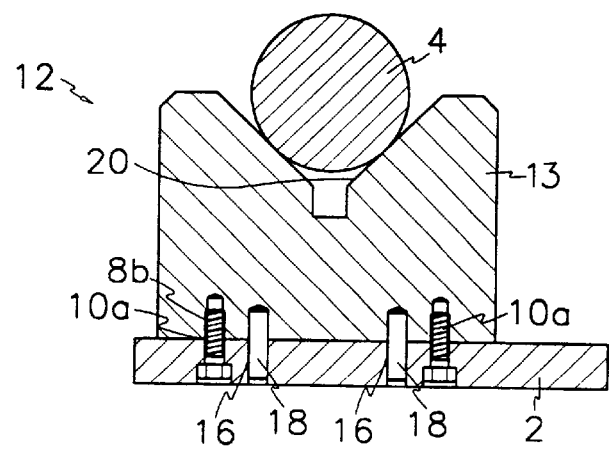
FIG. 2 is a sectional view taken along line I—I of FIG. 1.

The first and second supporters 12 and 14 are identical in structure, and will be described more in detail with reference to FIG. 2 showing a sectional view of the first supporter 12. The first supporter 12 is fixed on the horizontal base plate 2 by bolts 10a passing through coupling holes 8b formed in the horizontal base plate 2. The first supporter 12 is provided at its upper surface with a V-shaped supporting groove 20 to stably support the cylindrical camshaft 4. The initial mounting position of the first supporter 12 is determined by a positioning pin 18 fixed passing through a position hole 16 formed in the horizontal base plate 2 before the first supporter 12 is fixed on the base plate 2 by the bolts 10a. As the structure of the second supporter 14 is the same as that of the first supporter 12, the description thereof will be omitted herein.

Figure 3:
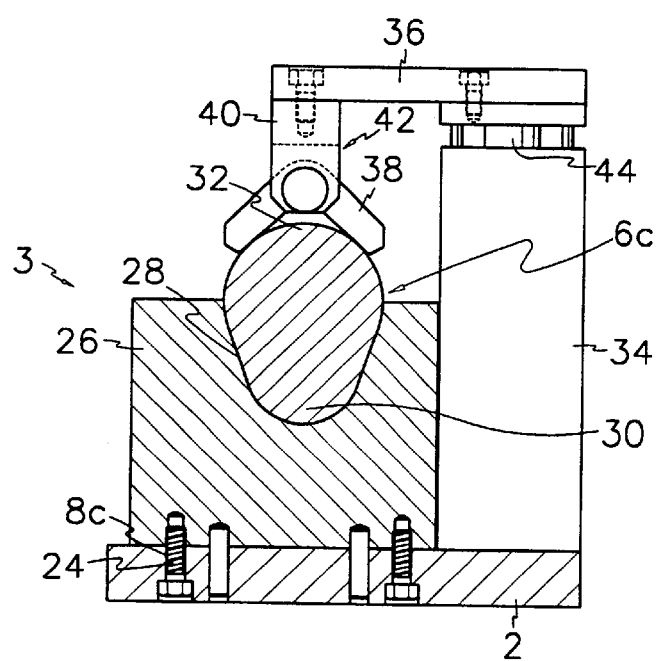
FIG. 3 is a sectional view taken along line II—II of FIG. 1.

The clamping member 3, as shown in FIG. 3, is also fixed on the horizontal base plate 2 by bolts 24. The clamping member 3 fixes the reference cam 6c that is used as a reference for the inspection of the phase angle error of the camshaft 4. The clamping member 3 comprises a cam master 26 fixed on the horizontal base plate 2 by the bolts 24 and having a recess 28 exactly complemental to a lobe 30 of the reference cam 6c; a hydraulic cylinder 34 generating force exerted on the reference cam 6c to prevent the reference cam 6c inserted in the recess 28 of the cam master 26 from rotating; a press rod 36 transmitting the force of the hydraulic cylinder 34 to the reference cam 6c; and a press pad assembly 42 fixed on a first end of the press rod 36 to close-tightly contact a base circle portion 32 of the reference cam 6c to securely fix the same.

The press rod 36 is connected at its second end to a piston rod 44 of the hydraulic cylinder 34 such that a reciprocating motion of the piston rod 44 is transmitted to the press pad assembly 42. The press pad assembly 42 comprises a pad portion 38 formed having a predetermined angle suitable for pressing the circumference of the base circle portion 32 of the reference cam 6c in a direction toward the cam master 26; and a connecting rod 40 connecting the first end of the press rod 36 to the pad portion 38. The pad portion 38 is pivotally coupled on the connecting rod 36.

Figure 4:
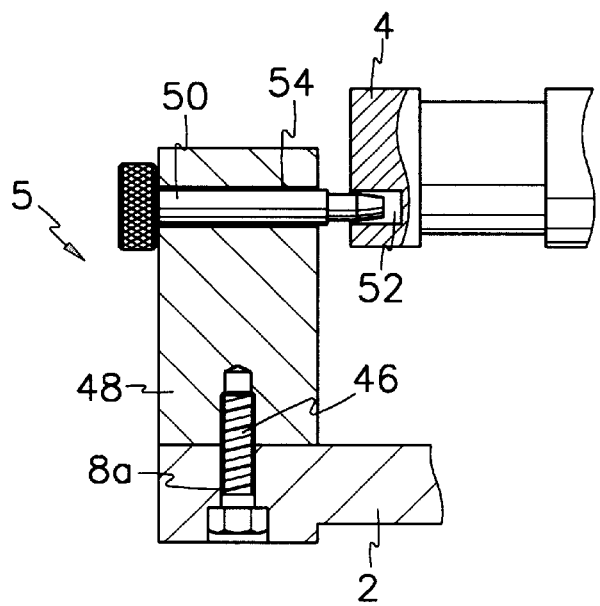
FIG. 4 is a sectional view illustrating a first inspecting member according to a preferred embodiment of the present invention.
Figure 5:
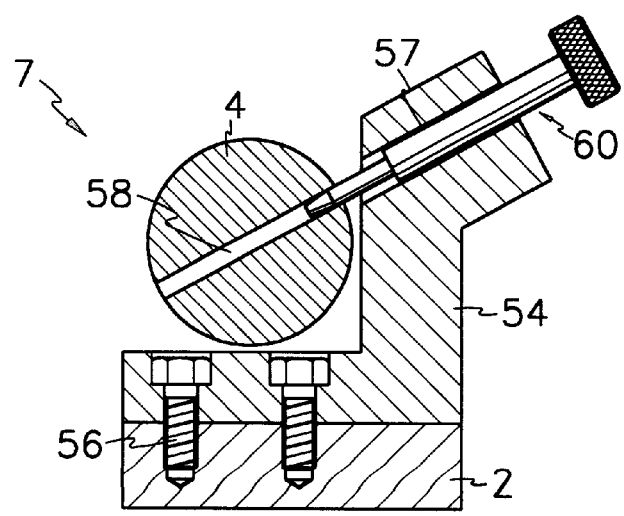
FIG. 5 is a sectional view taken along line III—III of FIG. 1 illustrating a second inspection member according to a preferred embodiment of the present invention.

The first inspecting member 5 inspects a phase angle error of a first location hole 52 eccentrically formed on an end wall of the camshaft 4 in the longitudinal direction of the same (see FIG. 4), and the second inspecting member 7 inspects a phase angle of a second location hole 58 formed along a radial direction of the camshaft 4 (see FIG. 5). Here, it should be noted that the first location hole 52 is inherently provided in the camshaft 4. A dowel pin is inserted in the first location hole 52 to prevent a camshaft sprocket from slipping when the camshaft 4 is installed in an actual engine of a vehicle. The second location hole 58 is also inherently provided on the camshaft 4, within which a hall sensor is disposed to adjust engine ignition timing.

The first inspecting member 5, as shown in FIG. 4, comprises a first check pin 50 moving into and out of the first location hole 52 and a first supporting plate 48 for supporting the first check pin 50 such that the same is positioned to precisely move into and out of the first location hole 52 in the longitudinal direction of the camshaft 4. The first location hole 52 is formed having a predetermined design phase angle with respect to the reference cam 6c of the camshaft 4. The first supporting plate 48 is fixed on the horizontal base plate 2 by a bolt 46 and has a supporting hole 54 through which the first check pin 50 is movably inserted. The phase angle error of the camshaft 4 is therefore determined in accordance with a deviation angle between the first location hole 52 and the reference cam 6c from the design angle.

Figure 6:
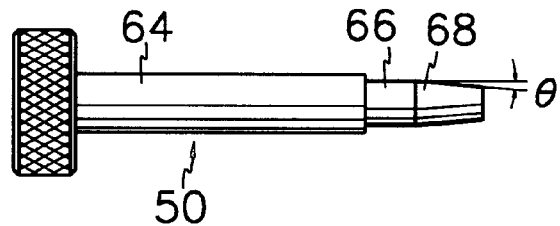
FIG. 6 is a side view illustrating a first check pin according to a preferred embodiment of the present invention.

The first check pin 50 has, as shown in FIG. 6, a first rod 64 movably located within the supporting hole 54 of the supporting plate 48, a second rod 66 extending from the first rod 64 and having a diameter equal to that of the first location hole 54, and a taper rod 68 extending from the second rod 66 and tapered to a predetermined angle θ. It is preferable that the taper angle θ of the taper rod 68 is about 3°.

The second inspecting member 7, as shown in FIG. 5, comprises a second check pin 60 moving into and out of the second location hole 58 and a second supporting plate 54 for supporting the second check pin 60 such that the same is positioned to precisely move into and out of the first location hole 52. The second location hole 58 is formed having a predetermined phase angle with respect to the reference cam 6c of the camshaft 4. The phase angle of the camshaft 4 can also be determined in accordance with a deviation angle between the second location hole 58 and the reference cam 6c from the design angle. The second supporting plate 54 is fixed on the horizontal base plate 2 by bolts 56 and has a supporting hole 57 through which the second check pin 60 is movably inserted.

Figure 7:
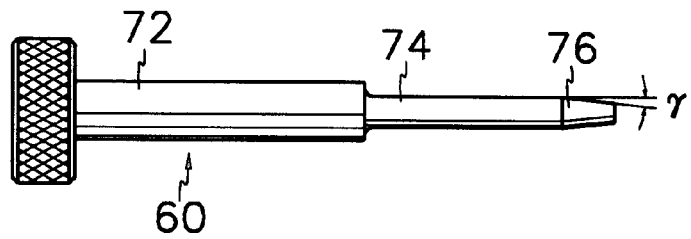
FIG. 7 is a side view illustrating a second check pin according to a preferred embodiment of the present invention.

The second check pin 60 has, as shown in FIG. 7, a first rod 72 movably located within the supporting hole 57 of the supporting plate 54, a second rod 74 extending from the first rod 72 and having a diameter equal to that of the second location hole 58, and a taper rod 76 extending from the second rod 74 and tapered to a predetermined angle γ. It is preferable that the taper angle γ of the third rod 76 is about 5°.

Now, a phase angle error inspecting method using the above-described apparatus will be described hereinafter.

First, the camshaft 4 is horizontally disposed on the supporters 12 and 14 such that the reference cam 6c is fixed by the clamping member 3. In this state, the first check pin 50 is moved into the first location hole 52 so as to detect a varied phase angle of the camshaft 4 in accordance with an insertion depth of the first check pin 50. The second check pin 60 is also moved into the second location hole 58 to detect a varied phase angle of the camshaft 4 in accordance with an insertion depth of the second check pin 50.

Describing more in detail, the camshaft 4 is disposed on the supporters 12 and 14 such that each cylindrical end is laid on the V-shaped grooves 21 of the supporters 12 and 14, respectively. When fixing the reference cam 6c, the lobe 30 is first inserted into the recess 28 of the cam master 26 of the clamping member 3, then the press pad assembly 42 depresses the circumference of the base circle portion of the reference cam 6c against the cam master 26 by the operation of the hydraulic cylinder 34. At this point, the inspector must ensure that an extreme end of the lobe 30 is precisely located at a center of the recess 28 to prevent a misreading in the inspection process.

Figure 8:
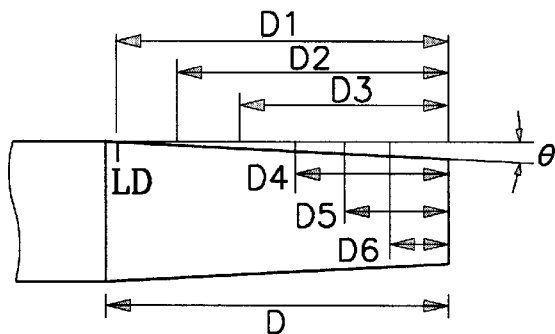
FIG. 8 illustrates test data showing phase angle error values of tested camshafts, which are measured according to insertion depths of a taper rod of a first check pin into each first location hole of tested camshafts.

FIG. 8 shows test data of phase angle error values of camshafts using the first inspecting member 5. The camshafts are measured according to an insertion depth D of the taper rod 68 of the first check pin 50 having a taper angle of 3° into first location holes of the camshafts. The tests were conducted in a state where the taper rod 68 of the first check pin 50 is equally divided to have six marks D1, D2, D3, D4, D5 and D6 indicating the insertion depths. The marks indicate different phase angle errors obtained through a series of tests of camshafts. Each phase angle error of the camshafts having first location holes into which the first check pin 50 is inserted up to each of the marks were measured using a conventional apparatus such as the three-dimensional apparatus.

It has been noted through the above tests that, a first tested camshaft having a first location hole through which the taper rod 68 was inserted up to the mark D1 has a phase angle error value of about 0.25°; a second tested camshaft having a first location hole through which the taper rod 68 was inserted up to the mark D2 has a phase angle error value of about 0.50°; a third tested camshaft having a first location hole through which the taper rod 68 was inserted up to the mark D3 has a phase angle error value of about 0.75°; a fourth tested camshaft having a first location hole through which the taper rod 68 was inserted up to the mark D4 has a phase angle error value of about 1.00°; a fifth tested camshaft having a first location hole through which the taper rod 68 was inserted up to the mark D5 has a phase angle error value of about 1.25°; and a sixth tested camshaft having a first location hole through which the taper rod 68 was inserted up to the mark D6 has a phase angle error value of about 1.50°.

On the basis of the data obtained through the tests, an inspector can select only camshafts that can be employed in an actual engine of a vehicle by using the apparatus of the present invention.

For example, if a pass depth mark LD is formed at a position corresponding to the mark D1, i.e., the upper limit phase angle error value being set at less than 0.25°, only camshafts that have first location holes through which the taper rod is inserted over the pass depth mark LD pass the inspection.

Figure 9:
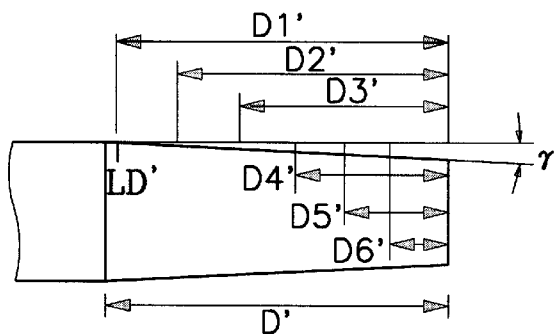
FIG. 9 illustrates test data showing phase angle error values of tested camshafts, which are measured according to insertion depths of a taper rod of a second check pin into each second location hole of tested camshafts.

Likewise, FIG. 9 shows test data of phase angle error values of camshafts using the second inspecting member 7. The camshafts are measured according to an insertion depth D' of the taper rod 76 of the second check pin 60 having a taper angle of 5° into second location holes of the camshafts. The tests were also conducted in a state where the taper rod 76 of the second check pin 57 is equally divided to have six marks D1', D2'. D3', D4', D5' and D6'. Each phase angle error of the camshafts having first location holes into which the second check pin 60 is inserted up to each of the marks were measured using a conventional apparatus such as the three-dimensional apparatus.

It has been noted through the above test that, a first tested camshaft having a second location hole through which the taper rod 76 was inserted up to the mark D1' has a phase angle error value of about 0.42°; a second tested camshaft having a second location hole through which the taper rod 76 was inserted up to the mark D2' has a phase angle error value of about 0.84°; a third tested camshaft having a second location hole through which the taper rod 76 was inserted up to the mark D3' has a phase angle error value of about 1.25°; a fourth tested camshaft having a second location hole through which the taper rod 76 was inserted up to the mark D4' has a phase angle error value of about 1.65°; a fifth tested camshaft having a first location hole through which the taper rod 76 was inserted up to the mark D5' has a phase angle error value of about 2.09°; and a sixth tested camshaft having a first location hole through which the taper rod 76 was inserted up to the mark D6' has a phase angle error value of about 2.51°. On the basis of the data obtained through the tests, an inspector can select only camshafts that can be applied to actual engines with use of the inventive inspecting apparatus.

That is, if a pass depth mark LD' is formed at a position corresponding to the mark D1, i.e., the upper limit phase angle error value being set at less than 0.42°, only camshafts that have second location holes through which the taper rod is inserted over the pass depth mark LD' pass the inspection.

Although there are two inspecting members provided to the above-described preferred embodiment, this is not limiting to the present invention. That is, the phase angle error of a camshaft can be inspected by only one of the two inspecting members. However, it is apparent that the reliability of the inspection can be increased when the phase angle error is inspected by both the two inspecting members.

For example, if at least one of the taper rods 68 and 76 is respectively inserted into the first and second location holes 52 and 57 of a camshaft by less than the limit depth marks LD and LD', the camshaft cannot pass the inspection.

While this invention has been described in connection with what is presently considered to be the most practical and preferred embodiment, it is to be understood that the invention is not limited to the disclosed embodiment, but, on the contrary, is intended to cover various modification and equivalent arrangements included within the spirit and scope of the appended claims.

What is claimed is:

1. An apparatus for inspecting a phase angle error of a camshaft having a plurality of cams and a first location hole with a predetermined phase angle with respect to the cams, the apparatus comprising:

a supporter for horizontally supporting the camshaft;

a clamping member for fixing at least one reference cam of the camshaft at a predetermined angle such that the camshaft cannot rotate; and a first inspecting member for inspecting an actual location of the first location hole of the camshaft, thereby inspecting a phase angle error of the camshaft, said first inspection member including a manually insertable check pin insertable into said first insertion hole a distance measurable longitudinally of the pin which can be correlated to the phase angle error.

2. The apparatus of claim 1 wherein the camshaft has a second location hole having a predetermined phase angle with respect to the cams and the apparatus further comprises a second inspecting member for inspecting an actual location of the second location hole of the camshaft, thereby inspecting a phase angle error of the camshaft, said second inspection member including a manually insertable check pin insertable into said second insertion hole a distance measurable longitudinally of the pin which can be correlated to the phase angle error.

3. The apparatus of claim 2 wherein the second check pin for checking the actual location of the second location hole is movably supported such that the second check pin moves toward a predetermined location of the second location hole, the predetermined location of the second location hole having the predetermined phase angle with respect to the reference cam.

4. The apparatus of claim 3 wherein the first check pin comprises a first rod movably supported by the supporting plate, a second rod extending from the first rod and having a diameter equal to that of the second location hole, and a taper rod extending from the second rod and tapered at a predetermined angle such that according to an amount of an insertion depth of the taper rod into the second location hole, a deviation of the actual location of the second location hole from the predetermined location can be determined, thereby determining the phase angle error of the camshaft.

5. The apparatus of claim 4 wherein the predetermined angle is about 5°.

6. The apparatus of claim 1 further comprising a horizontal base plate on which the supporter and the clamping member are fixed.

7. The apparatus of claim 1 wherein the supporter comprises a first block having a groove on which a first end of the camshaft is stably disposed, and a second block having a groove on which a second end of the camshaft is stably disposed.

8. The apparatus of claim 1 wherein the clamping member comprises a cam master having a recess complemental to a lobe of the reference cam, and a hydraulic pressure assembly for securely fixing the reference cam on the cam master by pressing a base circular portion of the reference cam.

9. The apparatus of claim 8 wherein the hydraulic pressure assembly comprises a hydraulic cylinder for generating pressing force, a press rod for transmitting the pressing force to the reference cam, and a press pad connected to the press rod to press the reference cam against the cam master.

10. The apparatus of claim 1 wherein the first check pin for checking the actual location of the first location hole is movably supported such that the first check pin moves toward a predetermined location of the first location hole, the predetermined location of the first location hole having the predetermined phase angle with respect to the reference cam.

11. The apparatus of claim 10 wherein the first check pin comprises a first rod movably supported by the supporting plate, a second rod extending from the first rod and having a diameter equal to that of the first location hole, and a taper rod extending from the second rod and tapered at a predetermined angle such that according to an amount of an insertion depth of the taper rod into the first location hole, a deviation of the actual location of the first location hole from the predetermined location can be checked, thereby determining the phase angle error of the camshaft.

12. The apparatus of claim 11 wherein the predetermined angle is about 3°.

13. A method for inspecting a phase angle error of a camshaft having first and second location holes each having a predetermined phase angle with respect to a reference cam of the camshaft, comprising the steps of:

fixing the camshaft such that the reference cam cannot be moved and the camshaft cannot rotate;

manually inserting a first checking member into the first location hole, the first checking member moving toward a predetermined location of the first location hole, said first inspection member including a manually insertable check pin insertable into said first insertion hole a distance measurable longitudinally of the pin which can be correlated to the phase angle error;

checking a deviation of an actual location of the first location hole from the predetermined location in accordance with an amount of inserting depth of the first checking member into the first location hole; and determining if the camshaft passes or fails in accordance with an amount of the deviation of the actual location of the first location hole.

14. The method of claim 13 further comprising the steps of:

manually inserting a second checking member into a second location hole, the second checking member moving toward a predetermined location of the second location hole, said second inspection member including a manually insertable check pin insertable into said second insertion hole a distance measurable longitudinally of the pin which can be correlated to the phase angle error;

checking a deviation of an actual location of the second location hole from the predetermined location in accordance with an amount of inserting depth of the second checking member into the second location hole; and determining if the camshaft passes or fails in accordance with an amount of the deviation of the actual locations of the first and second location holes.

* * * * *